United States Patent

[11] 3,599,369

[72] Inventor Arthur P. Carlson
       Millertown Road, Bedford, N.Y. 10506
[21] Appl. No 833,127
[22] Filed June 13, 1969
[45] Patented Aug. 17, 1971

[54] FISHING DEVICE
     4 Claims, 7 Drawing Figs.
[52] U.S. Cl. ............................................. 43/17,
                                              43/19.2, 43/26.1
[51] Int. Cl. ........................................... A01k 97/12
[50] Field of Search ............................... 43/17, 19.2,
                                                            26.1

[56] References Cited
          UNITED STATES PATENTS
1,778,422  10/1930  Joyal ........................... 43/17
2,122,836  7/1938   Gegerfeldt .................... 43/26.1

2,643,478  6/1953  Paulsen ........................ 43/19.2

*Primary Examiner*—Samuel Koren
*Assistant Examiner*—Daniel J. Leach
*Attorneys*—Robert S. Dunham, P. E. Henninger, Lester W. Clark, Gerald W. Griffin, Thomas F. Moran, R. Bradlee Boal, Christopher C. Dunham and Robert Scobey ABSTRACT: A fishing device including a tripod which can be set over an ice hole and which supports a wind-driven motor on one of the tripod legs. The motor rotates a flywheel to impart reciprocating motion to a link connecting a crankpin on the flywheel to one end of an arm of a bellcrank lever. A loop of a fishing line is disengageably supported on the other arm of the bellcrank lever and has an end with a baited hook thereon extending through the ice hole. Thus, the action of the wind motor imparts a reciprocating jigging motion to the line. The device also has a spring-carried flag which may be released by a pull on the fishing line.

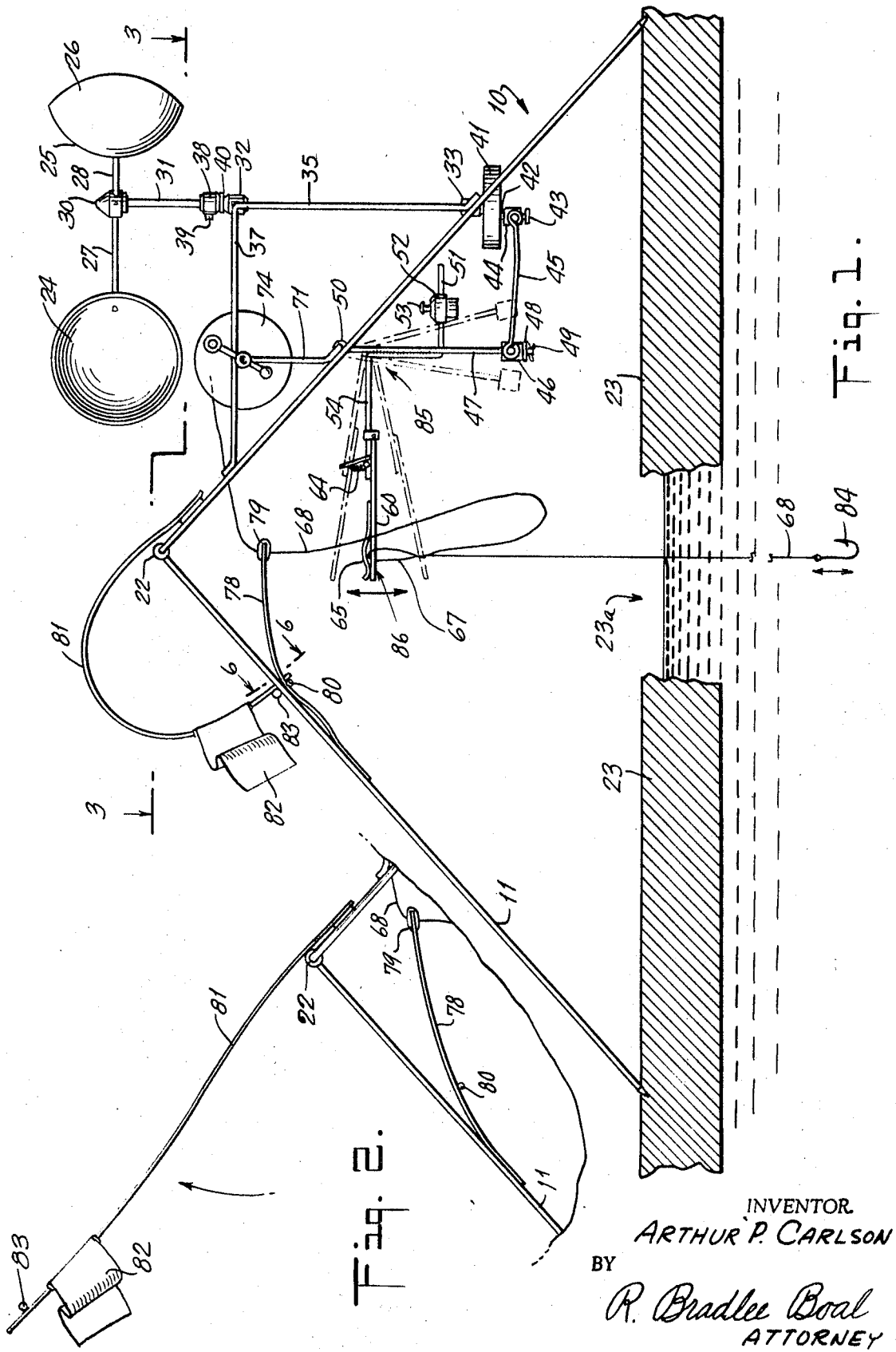

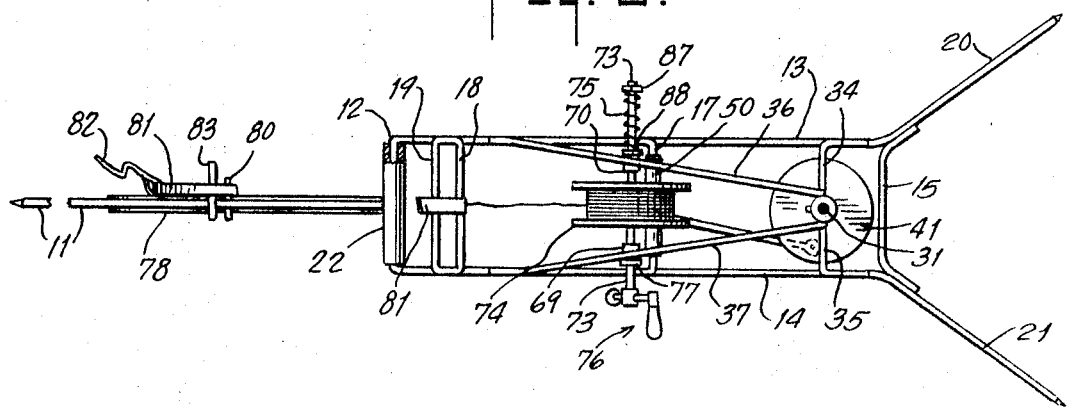

3,599,369

1

FISHING DEVICE

BACKGROUND OF THE INVENTION

It is common practice in ice fishing to set up several lines which may be left unattended, and checked for "bites" periodically. Prior art has disclosed ice-fishing devices which have included hand or wind operated means for imparting horizontal wide circular motion to the hook end of a fishing line (U.S. Pat. Nos. 2,122,836 and 2,972,204) as well as devices in which random jigging motion is imparted to a fishing line and an indicator flag is caused to be raised when there is a pull on the line (U.S. Pat. No. 3,187,456).

SUMMARY OF THE INVENTION

The subject invention relates to a fishing device including a tripod which can be set over a hole in the ice or set up on a float. The tripod supports a wind-driven motor for rotating a flywheel and thus imparting reciprocating motion to a link connecting a crankpin on the flywheel to one end of an arm of a bellcrank lever. At the opposite end of the other arm of the bellcrank lever, means is provided for disengageably supporting a loop on the fishing line. The action of the wind motor causes the bellcrank lever, and consequently the fishing line, to jig—to reciprocate primarily in the vertical direction. The tripod also supports a flag on a leaf spring and means for releasing the flag when there is a pull on the fishing line.

BRIEF DESCRIPTION OF THE DRAWINGS

FIG. 1 shows in side elevation a fishing device of the type to which the invention relates and contains an illustration of an indicator flag means in cocked position.

FIG. 2 illustrates in detail the indicator flag means in released position and shows the raised flag.

FIG. 3 shows a top plan view of the fishing device of FIG. 1 taken along line 3–3 in FIG. 1.

FIG. 4 shows a front elevational view of the fishing device of FIG. 1.

DETAILED DESCRIPTION

Figure 5:
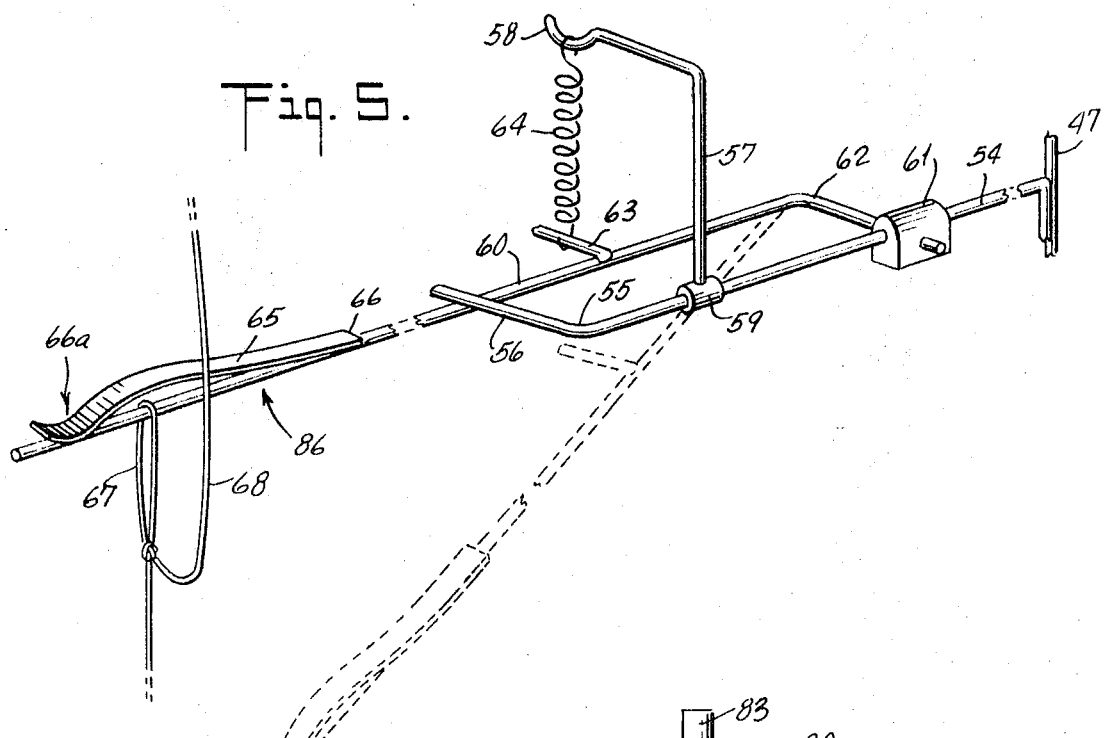
FIG. 5 is a perspective view in enlarged scale of a detail of a lever mechanism.

Referring to FIGS. 1, 3 and 4, the invented fishing device includes a supporting tripod made up of a yoke member generally indicated at 10 and a leg 11. The yoke member 10 is made up of two parallel rods 13 and 14 connected by crossbars 12, 15, 16, 17, 18 and 19. At the connection with the crossbar 15, rods 13 and 14 flare outwardly to form legs 20 and 21, respectively. The legs 20 and 21 as well as the leg 11 have pointed bottom tips 20a, 21a and 11a, respectively, for digging into an ice cover 23 or into a float (not shown).

The leg 11 terminates at its top end in a transverse sleeve 22 adapted to receive the top crossbar 12 of the yoke 10. The inner diameter of the sleeve 22 and the outer diameter of the crossbar 12 are such as to permit the sleeve 22 and the top crossbar 12 to rotate freely with respect to one another.

In use, the tripod is positioned over a hole 23a in the ice 23. The bottom portions of the yoke 10 and the leg 11 can be separated so as to clear the hole 23a and the pointed bottom tips 20a, 21a and 11a can then be dug into the ice 23 so that the tripod is firmly positioned in the ice over the hole 23a.

The tripod part supports a wind motor having hemispherical paddles 24, 25 and 26 supported respectively by arms 27, 28 and 29 extending from a hub 30 which is affixed onto the top end of a shaft 31. Although the paddles 24, 25 and 26 are shown as being sections of a sphere, they may have any other convenient shape such as that of pyramid, cone, frustum of cone, etc.

2

The shaft 31 is mounted for rotation about its axis in bushing bearings 32 and 33. The bushing bearing 32 is affixed to the tip of a V-shaped member whose legs 34 and 35 extend downwardly and are affixed to the rods 13 and 14, respectively, of the yoke 10 at the approximate location where the crossbar 16 is attached to the yoke. The bushing bearing 32 is also supported by the tip of another V-shaped member whose legs 36 and 37 are disposed at right angles to the legs 34 and 35 and are also affixed respectively to the rods 13 and 14 but at a location between the crossbars 17 and 18. The bushing bearing 33 is located in the middle of the crossbar 16 and is supported by it.

A positioning ring 38 is mounted on the shaft 31 and is affixed thereto by a setscrew 39. The positioning ring 38 rests on a washer 40 which in turn is supported by bushing bearing 32.

The bottom end of the shaft 31 is affixed to the center of a flywheel 41 and a vertically disposed crankpin 42 having a head 43 is mounted on the bottom of the flywheel 41 at a position offset from the center thereof. A universal joint 44 mounted on the crankpin 42 connects the pin 42 with a link 45. The link 45 connects at its other end to a universal joint 46 which is mounted on an arm 47 of a bellcrank lever 85. The universal joint 46 is retained on the arm 47 by a washer 48 supported by a cotterpin 49 which passes through the shaft 47.

The arm 47 terminates in a transverse sleeve 50 which is supportedly received on the crossbar 17. The inner diameter of the sleeve 50 and the outer diameter of the crossbar 17 are such that free rotation of the sleeve 50 about the crossbar 17 is allowed.

A counterweight arm 51 extends transversely from the arm 47 of the bellcrank lever 85 toward the shaft 31. A counterweight 52 is slidably mounted on the arm 51 and may be set at any location thereon by tightening a set screw 53. When the counterweight 52 is moved toward the free end of the counterweight arm 51, the moment of inertia of the bellcrank lever 85 is increased; conversely, when the counterweight 52 is moved toward the arm 47, the moment of inertia of the bellcrank lever 85 is decreased. A second arm 54 extends transversely from the shaft 47 in a direction opposite to that of a counterweight arm 51.

Referring to the view as shown in detail in FIG. 5, the arm 54 ends with a transverse section 56 formed at a right angle to the main portion of the arm 54 in the horizontal plane at an elbow 55. An L-shaped rod 57 having a hook 58 formed at its free end extends upwardly from the arm 54. The rod 57 starts upwardly from a sleeve 59 which is affixed to the arm 54. An extension or finger 60 is pivotally fixed to a sleeve 61 affixed to the arm 54. The finger 60 extends transversely from the arm 54 for a short distance and then ends at elbow 62 to continue therefrom parallel to the arm 54. The transverse section 56 of the arm 54 extends beyond the finger 60 and is disposed above it so as to limit the pivotal movement of the finger 60 in the upward direction. A tensioned spring 64 connects the hook 58 of the L-shaped rod 57 with a pin 63 extending outwardly from the finger 60 and urges them toward each other.

A spring-loaded latch 86 is disposed at the free end of the finger 60 and comprises a leaf spring 65 which is affixed at its end 66 to the finger 60, then raises away from the finger 62 to accommodate a loop 67 of a fishing line 68, and is pressed against the finger 60 at its other end 66a so as to retain disengageably the loop 67. When the line 68 is pulled straight down the finger 60 pivots downwardly against the tension of the spring 64 and the loop 67 slips out between the finger 60 and the pressing end 66a of the leaf spring 65.

Referring again to FIGS. 1, 3 and 4, a reel 74 for the fishing line 68 is supported by a mechanism including bushing bearings 69 and 70, best seen in FIG. 3, which are fixed to the legs 36 and 37 of the V-shaped member described above as supporting the bushing bearing 32. Vertical support rods 71 and 72, best seen in FIG. 4, extend respectively from the bushing bearings 69 and 70 to the sections 13 and 14 of the yoke member 10. A shaft 73 passes through the bushing bearings 69 and 70 and carries fixedly the reel 74 on its portion intermediate the bushing bearings 69 and 70.

The freedom of rotation of the reel 74 may be controlled by providing a brake means including a threaded end portion on the shaft 73 and nut 87 threaded thereon. A compressed coil spring 75 may be disposed on the shaft 73 between the nut 87 and a washer 88 resting against the bushing bearings 70. At the other end of the shaft 73, a hand crank 76 is provided for rotating the reel 74. A retaining washer 77, affixed to the shaft 73, rests against the bushing bearing 69 at a position chosen such that when the washer 77 is caused to press against the bushing bearing 69 by the action of the compressed spring 75, the reel 74 is centered between the bushing bearing 69 and 70.

Braking action is provided for the reel 74 by threading the nut 87 on the threaded portion of the shaft 73 to further compress the spring 75. When the spring 75 is further compressed, the force with which the washer 77 rotating with the shaft 73 bears against the bushing bearing 69 is increased. The increased friction slows down the rotation of the reel 74. Supplementary braking action is provided by friction between the spring 75, the nut 87, the shaft 73 and the washer 88.

Figure 6:
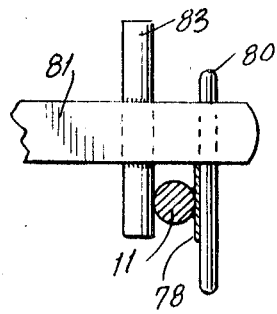
FIG. 6 is a sectional view taken along line 6–6 in FIG. 1 and shows in enlarged scale a detail of a locking mechanism for the flag means in locked position.
Figure 7:
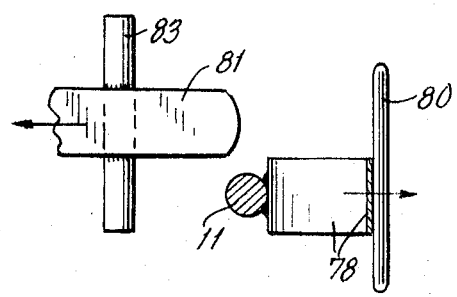
FIG. 7 is a view similar to that of FIG. 6 but shows a locking mechanism immediately after unlocking.

Referring now to FIGS. 1, 2, 6 and 7, the flag indicator means comprises a leaf spring 78 affixed at one end to the midsection of the leg 11 and extending therefrom freely toward the yoke member 10 to terminate, before reaching the yoke member, in an eyelet ring 79 through which the fishing line 68 is passed. A short crossbar 80, best visible in FIG. 6 in which the leaf spring 78 is shown in cross section, is affixed to the leaf spring 78 at approximately its midpoint. Another leaf spring 81 is affixed at one end to the crossbars 18 and 19 of the yoke member 10 and extends freely therefrom upwardly. A flag 82 which would usually be colored red for best visibility is attached to the leaf spring 81 near its free ends. A short transversal crossbar 83, best seen in FIGS. 6 and 7, is affixed to the leaf spring 81 between its free end and the flag 82.

In operation, the invented fishing device can be positioned over a hole 23a in the ice 23 as shown in FIG. 1 or over a float (not shown) resting on the water surface. The yoke member 10 and the leg 11 can be spread to clear the hole 23a and the pointed tips 11a, 20a and 21a of the legs 11, 20 and 21 can be dug into the ice. The fishing line 68 is threaded from the reel 74 through the eyelet ring 79 and a hook 84 with suitable bait is attached to the free end of the line 68 and dropped into the water. After the appropriate length of fishing line 68 has been fed into the water, a loop 67 is made on the line 68 and the loop 67 is slipped into the spring-loaded latch 86, as best seen in FIG. 5.

The flag indicator is then set by positioning the leaf springs 78 and 81 as shown in FIG. 1 and as best seen in greater detail in FIGS. 6 and 7. In particular, the leaf spring 78 carrying the eyelet ring 79 is first brought close to the inner side of the leg 11 such that the section of the leaf spring 78 carrying the short crossbar 80 bears against the inner side of the leg 11. Then the leaf spring 81 carrying the flag 82 is bent downward in an arc such that the tip of its free end is brought down, on one side of the leg 11, and over the short crossbar 80 of the leaf spring 78. At that time, the short crossbar 83 of the leaf spring 81 rests against the outside of the leg 11 and the flag indicator means is set into cocked position.

The tip of the free end of the leaf spring 81 cannot go further to the inside of the leg 11 because it is stopped by the short crossbar 83 resting against the leg 11, and the leaf spring 81 cannot straighten out because its free end is restrained by the short crossbar 80 of the leaf spring 78. The leaf spring 78 cannot get away from the leg 11 because it is frictionally held by the tip of the free end of the leaf spring 81 resting against the short crossbar 80. The column strength of the leaf spring 78 is such that is portion below the crossbar 80 does not buckle under the force of the leaf spring 81.

When the tripod is set up, the paddles 24, 25 and 26 are rotated by the wind. Since the hub 30 is fixedly attached to the shaft 31, the shaft 31 rotates and causes the flywheel 41 to rotate at the same angular speed. Since the crank pin 42 is offset from the center of the flywheel 41, the rotation causes the link 45 to reciprocate with the rotation of the flywheel 41.

This reciprocating motion causes the bell crank lever 85 to rock back and forth about the crossbar 17 of the yoke member 10 as shown in dotted lines in FIG. 1.

In the course of the rocking motion, the arm 54 moves up and down. The finger 60 moves up and down with the arm 54 and the fishing line 68 which depends from the finger 60 moves with it up and down in jigging motion. The loop 67 of the fishing line 68 thus moves substantially in the vertical plane, in an up-and-down motion over a path of substantially fixed dimensions.

If the wind is light, the counterweight 52 may be moved all the way next to the arm 47 or else taken altogether off the counterweight arm 51 so as to minimize the mass which has to be moved in rocking motion and thus minimize its moment of inertia. If the wind is strong, the counterweight 52 may be positioned near the free end of the counterweight arm 51 so as to maximize the moment of inertia of the mass which has to be rocked and thus control the rate of jigging the fishing line.

If a fish bites, the fishing line 68 will be pulled downwardly. The loop 67 pulls the finger 60 and tilts it downwardly. With the finger 60 tilted downwardly, and with continuing pull on the fishing line 68, the loop 67 slips out of the spring-loaded latch 86. As the line 68 is further pulled, it tends to pull the leaf spring 78 downwardly, by pulling the eyelet ring 79 downwardly and away from the leg 11. This causes the crossbar 80 on the leaf spring 78 to separate from the inner side of the leg 11 and move away from it. As the crossbar 80 moves away from the inner side of the leg 11, the tip at the free end of the flag leaf spring 81 is released and the leaf spring 81 snaps back to its original position. The flag 82 is thus raised to indicate to the fisherman that there has been a bite.

The substantially vertical jigging motion of the line 68 and hook 84 has been found to produce improved results in fishing. Furthermore, in view of the fact that the motor is wind-driven the jigging motion of the hook varies in speed according to the velocity of the wind and typically fluctuates with the wind velocity. This also produces superior fishing results.

After there has been a bite and the fisherman has been alerted to the fact by the raising of the flag 82, he may attend the device by cranking the reel 74 in conventional manner to take up the free line and get the fish. After the fish has been removed from the line 68 and the line rebaited, the flag indicator may then be reset as described above and the line dropped into the water.

While a preferred embodiment is shown of a fishing device in which the flywheel is driven by a wind-driven motor, it can readily be appreciated that in other embodiments different means may be used to drive the flywheel. For example, a simple battery-powered motor may be used which would impart rocking motion to the belt crank lever 85. Alternatively, a hand crank could be used. Similarly, while the link 45 has been shown to be connected to universal joints 44 and 46, other well-known mechanical devices such as ball and socket might be used. Similarly too, while a tripod support device has been shown in the preferred embodiment in which a yoke-type structure supports the motor and reel mechanisms, other well-known support devices may also be used.

The device described in the preferred embodiment may be folded up by pivoting leg 11 to the point where it is aligned with the yoke member 10. The hemispherical cups 24, 25 and 26 and their arms 28, 29 and 30 may be disengageable from hub 30 so that they may be removed when not in use. In this manner the apparatus can be folded compactly and stored away.

The fishing device as shown herein may also be used for fishing when there is no ice. For example, a float could be made in which a hole is cupped, which would correspond to the hole 23a in the ice as shown in the preferred embodiment.

The preferred embodiment of the subject fishing device has been described as having legs with sharpened ends for digging into the ice. Alternative means may also be provided for achieving the desired effect of a fishing device which will not slide out of the desired position when set up on a leg surface.

For example, feet may be provided for the legs which will have a plurality of teeth for gripping the ice. Alternative gripping means may also be provided. Furthermore means may be provided for limiting the rotational movement of leg 11 relative to yoke member 10. For example, a single flexible line may connect bottom crossbar 15 to leg 11 and thereby limit the rotational movement of yoke member 10 relative to leg 11.

I claim:

1. In a fishing device using fishing line terminating in suitable baiting tackle, the improvement comprising:
   a. means for disengageably suspending the line;
   b. motor means for generating rotational motion;
   c. means connecting the motor means to the suspending means for translating the rotational motion of the motor means to reciprocating motion of the suspending means;
   d. means for supporting the suspending means, the motor means and the translation means in cooperating relationship;
   e. said motor means including a rotatable flywheel having a crankpin offset from its center of rotation;
   f. said means for translating including a link connected at one end to said crankpin; and
   g. said suspending means comprising a bellcrank lever pivoted on said supporting means, said bellcrank lever suspending the fishing line at one of its ends and connected to the other end of said link at its other end, whereby rotation of the flywheel causes the bellcrank lever to rock about its pivot and to reciprocate the suspended fishing line.

2. A fishing device as in claim 1 wherein said bell crank lever is pivoted about a horizontal axis and extends perpendicularly therefrom, with the line suspending end substantially horizontal, whereby the rocking motion of the bellcrank lever is in a vertical plane and the fishing line is jigged in an up-and-down motion.

3. A fishing device including a fishing line terminating in suitable baiting tackle, comprising:
   a. a tripod support including a horizontal crossbar;
   b. a bellcrank lever pivoted about said horizontal crossbar;
   c. an extension extending away from one end of said bellcrank lever and pivotally connected thereto for downward deflections about the pivot;
   d. means including spring means connecting the bellcrank lever to the extension for urging the extension against downward deflection;
   e. a spring latch mechanism carried at the free end of said extension for disengageably suspending selectable lengths of fishing line;
   f. a wind motor including a plurality of cup-shaped paddles, a shaft connected thereto and driven thereby, said shaft rotatably supported by said tripod, and a flywheel carried and driven by said shaft, said flywheel carrying a crankpin extending therefrom at a point offset from the center of rotation of the flywheel; and
   g. a link connecting the crankpin to the other end of said bellcrank lever, whereby rotation of the flywheel is translated to rocking motion of the bellcrank lever about said horizontal crossbar and whereby the suspended length of fishing line is caused to jig in an up-and-down motion.

4. A fishing device as in claim 3 and further comprising:
   a. a rotatable reel for carrying a length of fishing line continuous with the length of line suspended from said extension;
   b. breaking means for selectively frictionally interfering with free rotation of said reel;
   c. means connected to the tripod for carrying said reel and said braking means; and
   d. a flag indicator means comprising:
      i. a leaf spring connected at one end to said tripod and extending upwardly therefrom;
      ii. a flag carried by the free end of said leaf spring; and
      iii. releasable means carried by said tripod and connected to said line for retaining the flag end of the leaf spring against the compressive force of the leaf spring and for releasing said free end upon a pull on the fishing line.